(12) United States Patent
Engel et al.

(10) Patent No.: US 7,868,780 B2
(45) Date of Patent: Jan. 11, 2011

(54) SYSTEM AND METHOD FOR TEST PROBE MANAGEMENT

(75) Inventors: Glen R. Engel, Snohomish, WA (US); Glen L. Purdy, Jr., Snohomish, WA (US); Jerry J. Liu, Sunnyvale, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 876 days.

(21) Appl. No.: 11/230,774

(22) Filed: Sep. 20, 2005

(65) Prior Publication Data

US 2007/0063871 A1    Mar. 22, 2007

(51) Int. Cl.
G08C 17/00    (2006.01)

(52) U.S. Cl. .................. 340/870.07; 455/67.11; 714/39.43

(58) Field of Classification Search ............ 340/870.07; 455/67.11, 422.1; 714/39.43
See application file for complete search history.

(56) References Cited

U.S. PATENT DOCUMENTS

| | | | |
|---|---|---|---|
| 5,335,186 A | | 8/1994 | Tarrant |
| 5,874,903 A | * | 2/1999 | Shuey et al. ............ 340/870.02 |
| 6,002,996 A | | 12/1999 | Burks et al. |
| 6,854,055 B1 | | 2/2005 | Stinus et al. |
| 7,312,721 B2 | * | 12/2007 | Mason et al. .......... 340/870.02 |
| 2003/0171111 A1 | * | 9/2003 | Clark ..................... 455/414.1 |
| 2004/0015618 A1 | * | 1/2004 | Risi et al. ..................... 710/15 |
| 2004/0196182 A1 | | 10/2004 | Unnold |
| 2004/0203437 A1 | * | 10/2004 | Burch et al. ............ 455/67.11 |
| 2005/0181781 A1 | | 8/2005 | Starks |

FOREIGN PATENT DOCUMENTS

| | | |
|---|---|---|
| DE | 10101805 | 7/2002 |
| GB | 2408344 | 5/2005 |
| GB | 2410554 | 8/2005 |
| JP | 2000074707 | 3/2000 |

OTHER PUBLICATIONS

GB Search Report dated Jan. 23, 2007.
U.S. Appl. No. 11/230,878, filed Sep. 20, 2006, Engel et al.
U.S. Appl. No. 11/230,395, filed Sep. 20, 2005, Engel et al.

* cited by examiner

*Primary Examiner*—Brian A Zimmerman
*Assistant Examiner*—Hung Q Dang
(74) *Attorney, Agent, or Firm*—Volentine & Whitt, PLLC

(57) ABSTRACT

Individual probe management is accomplished in a measurement system by communicating configuration data to each probe based on that probe's received metadata. In one embodiment, the configuration data is sent from a server and the server does not keep track of the probe's configuration. The configuration data can be, for example, parameters used to directly configure the probe or software modules for running on the probe.

20 Claims, 2 Drawing Sheets

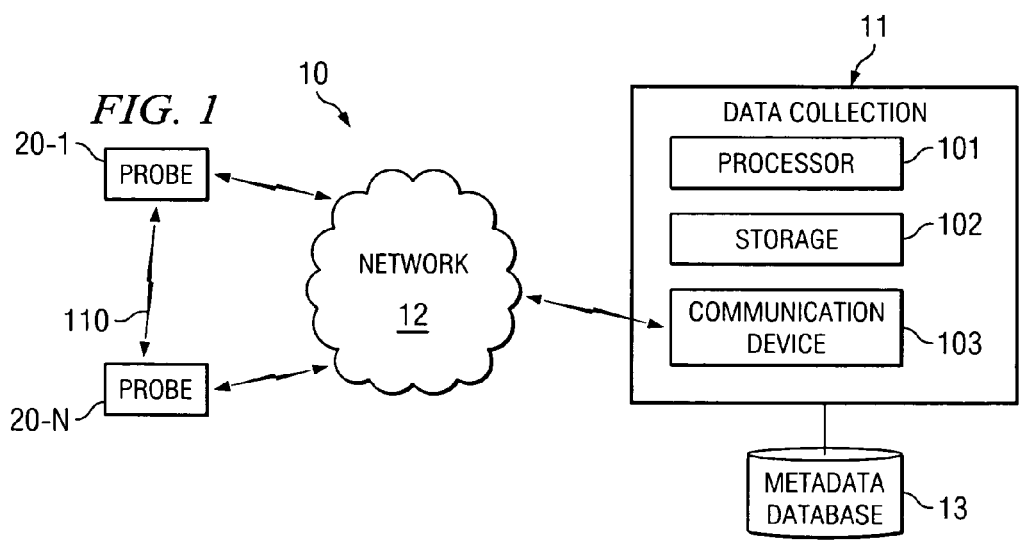

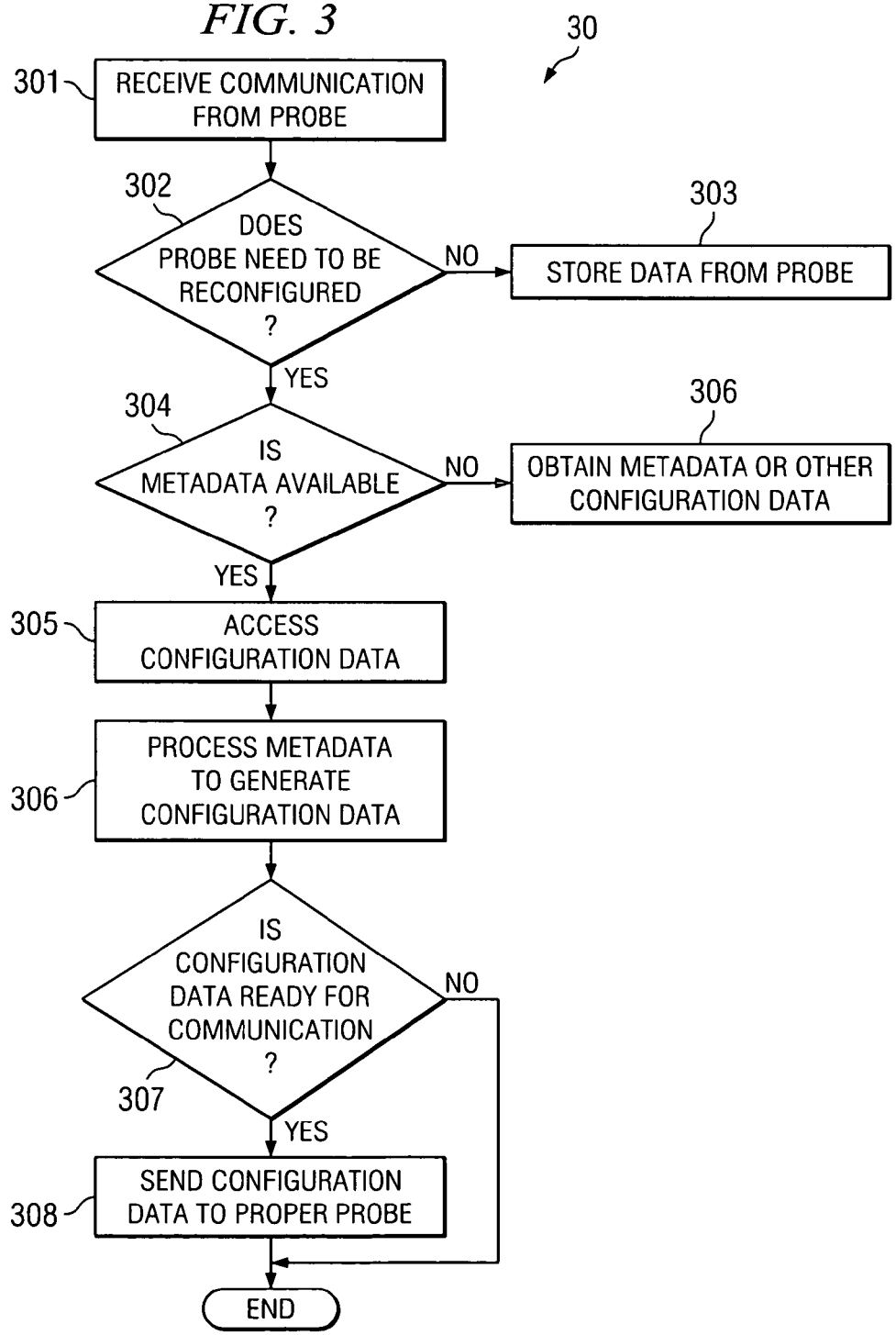

SYSTEM AND METHOD FOR TEST PROBE MANAGEMENT

CROSS-REFERENCE TO RELATED APPLICATIONS

This application is related to concurrently filed and commonly assigned U.S. patent application Ser. No. 11/230,878 entitled "SYSTEM AND METHOD FOR OPPORTUNISTIC TRANSMISSION OF TEST PROBE METADATA", and concurrently filed and commonly assigned U.S. patent application Ser. No. 11/230,895 entitled "SYSTEM AND METHOD FOR SELECTIVE DISTRIBUTION OF MEASUREMENT DEVICE CONFIGURATION IN A LOOSELY COUPLED AUTONOMOUS SYSTEM", the disclosures of which are hereby incorporated herein by reference.

TECHNICAL FIELD

This invention relates to test probe management and more particularly to a system and method for managing and differentiating test probe information in a high capacity measurement system.

BACKGROUND OF THE INVENTION

It is customary for measurement systems to use a number of individual measurement devices (probes) to obtain data at particular locations within a system being monitored. It is also customary for the measurement system to keep track of each probe by knowing, for example, its identity, its type, what units it measures in, etc. The information pertaining to each probe (called metadata) is stored in a measurement system database for interpretation of data from the various probes and for probe configuration purposes.

In a system with a large number of such probes the management and distribution of configuration information for each probe can become a burden for servers and databases which must manage the individual configuration state for each probe. Thus, when a probe changes its behavior, for example, by going offline, reducing its data transfer rate, etc., the system must deal with the new condition and often must deliver this new information to other probes in the system under test or to other measurement systems.

BRIEF SUMMARY OF THE INVENTION

Individual probe management is accomplished in a measurement system by "pushing" configuration data to each probe based on that probe's received metadata. In one embodiment, the configuration data is sent from a server and the server does not keep track of the probe's configuration. The configuration data can be, for example, parameters used to directly configure the probe or parameters for configuring the probe's software.

In situations where the data received from the probe contains a probe identifier, the measurement system can track data on a probe-by-probe basis. In such situations, the measurement system can perform probe specific or probe aggregated analysis even though each probe is anonymous from a system configuration perspective. In other situations, the data received can be anonymous.

In one embodiment, probes can configure other probes by point-to point, or point-to-multipoint, communication.

BRIEF DESCRIPTION OF THE DRAWINGS

FIG. 1 illustrates one embodiment of a multi-probe measurement system;

FIG. 2 shows one embodiment of a probe having various controls for sending metadata; and FIG. 3 shows one embodiment of a probe configuration arrangement for a measurement system.

DETAILED DESCRIPTION OF THE INVENTION

FIG. 1 illustrates one embodiment 10 of a test measurement system having a plurality of spaced apart probes. The concepts taught herein can be used in such a system or can be used with any system in which a data collection point has metadata (or parameter data) for each probe. In the discussion to follow, a test system will be described where the metadata is communicated from the various probes, such as from probes 20-1 to 20-N, to the data collection point. In this example, sensor 20-1 is a sensor that is producing, for example, temperature readings and is designed to report its metadata (if metadata is required) on demand of a test system. The sensor could, if desired, be designed to occasionally transmit part, or all, of its metadata by omitting a regular scheduled temperature reading or it could randomly insert the metadata transmission (e.g., once an hour, once a day, etc.), or it could wait for its battery level to be high, or it could use other opportunistic criteria useful to its situation.

In the embodiment of FIG. 1, the data from probe 20-1 is transmitted to data collection 11 via network 12 either wirelessly or by wireline or by a combination thereof. Also note that a network need not be used, but rather some or all of the communications from probes 20-1 to 20-14 can be point-to-point using one or more wireless protocols, such as, for example, the Bluetooth protocol.

FIG. 2 shows one embodiment 20 of a probe having various controls for sending metadata. In the embodiment, metadata contained in storage 21 and data from the probe (for example data obtained via input 25), is stored in storage 23. Note that storages 21 and 23 can be the same storage if desired. Also note that the measured data sent from probe 20 need not be stored and can be sent directly from input 25 as collected. Input 25 can measure data, or sense data, or sense conditions and report the results of the "sensing". In addition, data can be provided to input 25 from other sensors. In the discussion herein, measured data sent from probe 20 includes any mode or manner of collecting and sending such data. In the embodiment, data is sent under control of processor 22 and communicator 24.

Control units 201-206 allow various opportunistic metadata transfers, with each such metadata transfer usually being less than all of the metadata necessary for a data collected in a device, such as device 11 FIG. 1, to fully utilize the data sent from the probe. Also note that not all probes require all controls 201-206 and probes may have other controls or timers or sensors for controlling other opportunistic events. In many situations, such opportunistic data transfers are not required and metadata can be sent all at one time if such metadata is required.

FIG. 3 shows one embodiment 30 of a probe configuration arrangement for a measurement system. Process 301 receives data from a probe and process 302 determines if this is a probe that must be reconfigured (such as a new probe, or a probe whose configuration must be changed for some reason). If the probe does not have to be configured, then process 303 stores the data from the probe in the customary manner.

If the probe must be configured or reconfigured, process 304 determines if enough configuration information (such as, for example, metadata) is available.

If metadata (or other information that allows for a proper determination of probe configuration) is available, processes 305, 306 and 307 obtains the metadata and forms the configuration data that is be sent to the probe. Process 308 sends the configuration data to the proper probe. This communication can be over one or more links, such as, for example, network 12, FIG. 1. The communication can be point to point, using any desired communication medium, including wireline or wireless and using any one or more communication protocols. Note that communication to and from any probe need not be the same as communication to any other probe.

In the system discussed herein, the assumption can be made, if desired, that the probes require zero state tracking from the configuration point. In addition, it is assumed that probes may come and go from time to time and may or may not participate in a measurement (or set of measurements) at any particular time. Based on these assumptions, each probe must manage its own state by obtaining its state data (configuration data) from the server or data collection point.

The server, as discussed above only delivers configuration information upon request and makes no attempt to track the configuration of any particular probe. The probes then must 'pull' configuration information rather than having it pushed out by the server.

The configuration information supplied by the server to the probes in one embodiment is determined by the metadata supplied by the probe. Examples of the metadata may be probe type, probe owner, probe capabilities, probe power level, current location, timestamp, etc.

The configuration can manifest itself in the form of parameters used to configure the probe software. Alternatively, the configuration can manifest itself in the form of executable code modules and associated configuration parameters to allow new capabilities in the probe at configuration time.

Even though the probes are managed anonymously the system is still able to track data on a probe-by-probe basis if data produced by each probe contain an identifier that can be used to uniquely identify data produced by an individual probe.

Consider one example having 24 phones with an embedded measurement agent (probe) in each phone. The phones contact a server and provide their current location as a piece of metadata. The server then looks for measurement configurations that cover the region around that location and communicates that data to the phone. The phone then begins making measurements based on this configuration and sends the measured data to the server with each data point tagged with its unique identifier. The server does not need to know anything about the probe other than its location and the fact that it is requesting configuration in order to generate reports based on data reported by that phone. Thus, the management of each probe is anonymous while the data reported from each probe is not.

In another embodiment, in cases where the probes can communicate with each other via peer to peer protocols such as Wifi or Bluetooth, the probes can retrieve configuration information from nearby probes.

Note that it is possible for the data from the devices to be anonymous as well. Consider a temperature sensor that reports only temperature, a timestamp, and a location. A server can utilize this data in analysis without knowing anything about the probe that generated the data.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A probe for use in a measurement system, said probe comprising:
    means for communicating metadata from the probe to a remotely located measurement system;
    means for communicating from the probe to the measurement system a request for updated measurement configuration data for reconfiguring the probe to perform measurements;
    means for receiving the requested updated measurement configuration data, wherein said updated measurement configuration data is operable for reconfiguring said probe to performs the measurements, wherein said updated measurement configuration data is communicated to said probe at least in part from said measurement system without said measurement system keeping track of a current configuration of said probe, and wherein the updated measurement configuration data is generated from the metadata communicated by the probe; and
    means for communicating measured data in accordance with said updated measurement configuration data.

2. The probe of claim 1 further comprising:
    means for communicating said measured data to said measurement system.

3. The probe of claim 1 further comprising:
    means for communicating said measured data to at least one other of said probes.

4. The probe of claim 1 wherein said updated measurement configuration data is communicated to said probe at least in part from another of said probes.

5. The probe of claim 1, wherein the means for communicating measured data communicates the measured data anonymously.

6. The measurement system of claim 1, wherein the metadata is not uniquely identified with the probe and includes at least one of a current location and a probe type.

7. A measurement system comprising:
    a plurality of spaced apart probes;
    a central processing system separated and spaced apart from the probes;
    communication links between the central processing system and the probes;
    communication control at said probes for sending metadata from said probes to the central processing system, and for sending from the probes to the central processing system requests for measurement configuration data for configuring the probes to perform measurements; and configuration control at said central processing system for generating the requested measurement configuration data from the metadata and sending the requested measurement configuration data from said central processing system over said communication links to said probes without said central processing system keeping track of current configurations of said probes.

8. The measurement system of claim 7 wherein said communication control at each said probe sends data obtained at said probe to said central processing system.

9. The measurement system of claim 8 wherein said obtained data from said probes is processed anonymously.

10. The measurement system of claim 8 wherein the data communicated from each said probe comprises probe identity data as well as measured data, and wherein said measured data from said probes is processed as an aggregate among a plurality of probes, said aggregate being determined, at least in part, by said probe identity information.

11. The measurement system of claim 7, wherein the metadata is not uniquely identified with the probe and includes at least one of a current location and a probe type.

12. A probe for use in a measurement system, said probe comprising:
  a communication output operable for communicating metadata over a wireless network to a remote data collection point, and for communicating over the wireless network from the probe to the remote data collection point a request for measurement configuration data for configuring the probe to perform measurements;
  storage for receiving via the wireless network the requested measurement configuration data, wherein said received measurement configuration data is uniquely associated with said probe, wherein said configuration data is operable for establishing a measurement configuration of said probe, and wherein the received measurement configuration data is generated from the metadata communicated by the probe to the remote data collection point; and
  an output for sending measured data over the wireless network from said probe to the remote data collection point, said measured data packaged in accordance with the received measurement configuration data.

13. The probe of claim 12 wherein said measurement configuration data is sent to said probe from said data collection point.

14. The probe of claim 12 wherein said output is further operable for communicating data to at least one other of said probes, said communicated data comprising measurement configuration data for the at least one other probe.

15. The probe of claim 12 wherein said measurement configuration data is communicated to said probe at least in part from another of said probes.

16. The probe of claim 12, wherein said measured data is sent anonymously from the probe to the remote data collection point.

17. A method for use in a measurement system, said method comprising:
  communicating metadata of each of a plurality of spaced apart probes from said probes to a measurement system via a wireless network;
  communicating to the measurement system from the spaced apart probes requests for corresponding measurement configuration data for configuring the spaced apart probes to perform measurements;
  receiving the requested measurement configuration data at the plurality of spaced apart probes, wherein said measurement configuration data for each probe is not uniquely associated with said probe, wherein said measurement configuration data is operable for establishing measurement configurations of said probes, and wherein the measurement configuration data for each said probe is generated from the metadata communicated by each said probe;
  making measurements at the plurality of spaced apart probes in accordance with the measurement configuration data, to obtain measured data;
  communicating the measured data from each said probe in accordance with said measurement configuration data for each said probe, wherein said measured data is communicated anonymously from each said probe; and
  in response to the metadata for one of the plurality of spaced apart probes changing after the probe has previously been configured:
    communicating updated metadata of the one probe from the one probe to the measurement system via the wireless network,
    communicating to the measurement system from the one probe a request for updated measurement configuration data for configuring the one probe to perform measurements,
    receiving updated measurement configuration data at the one probe, wherein the updated measurement configuration data is not uniquely associated with the one probe, wherein the updated measurement configuration data is operable for establishing an updated measurement configuration of the one probe, and wherein the updated measurement configuration data for the one probe is generated from the updated metadata communicated by the one probe,
    making measurements at the one probe in accordance with the updated measurement configuration data for the one probe, to obtain new measured data, and
    communicating the new measured data from the one probe in accordance with the updated measurement configuration data for the one probe.

18. The method of claim 17 wherein said measured data is communicated to said measurement system.

19. The method of claim 17 wherein said measurement system generates the requested measurement configuration data for each probe in response to the metadata but does not keep track of said measurement configurations of said probes.

20. The method of claim 17 wherein said measurement configuration data is communicated to said probes at least in part from another of said probes.

* * * * *